US009196227B2

(12) United States Patent
Leventhal et al.

(10) Patent No.: US 9,196,227 B2
(45) Date of Patent: Nov. 24, 2015

(54) SELECTING TECHNIQUES FOR ENHANCING VISUAL ACCESSIBILITY BASED ON HEALTH OF DISPLAY

(71) Applicant: AI Squared, Manchester Center, VT (US)

(72) Inventors: Aaron M. Leventhal, Winchester, MA (US); Jeffrey P. Bigham, Rochester, NY (US)

(73) Assignee: AI Squared, Manchester Center, VT (US)

( * ) Notice: Subject to any disclaimer, the term of this patent is extended or adjusted under 35 U.S.C. 154(b) by 23 days.

(21) Appl. No.: 14/018,378

(22) Filed: Sep. 4, 2013

(65) Prior Publication Data

US 2014/0063070 A1 Mar. 6, 2014

Related U.S. Application Data

(60) Provisional application No. 61/697,054, filed on Sep. 5, 2012.

(51) Int. Cl.
*G09G 5/00* (2006.01)
*G09G 5/37* (2006.01)
*G09G 5/373* (2006.01)
*G06F 3/0481* (2013.01)
*G06F 9/44* (2006.01)

(52) U.S. Cl.
CPC .............. *G09G 5/37* (2013.01); *G06F 3/0481* (2013.01); *G06F 3/04812* (2013.01); *G06F 9/4443* (2013.01); *G09G 5/373* (2013.01); *G06F 2203/04805* (2013.01); *G06F 2203/04806* (2013.01)

(58) Field of Classification Search
CPC ................... G06F 2203/04806; G06F 3/0481; G06F 17/211; G06F 2203/04805; G06F 3/04812
USPC ....................................................... 345/660
See application file for complete search history.

(56) References Cited

U.S. PATENT DOCUMENTS

| 6,704,034 B1 | 3/2004 | Rodriguez et al. |
| 7,916,157 B1 | 3/2011 | Kelley et al. |
| 2002/0010707 A1 | 1/2002 | Chang et al. |

OTHER PUBLICATIONS

Invitation to Pay Additional Fees for PCT/US2013/058098, mailed Jan. 29, 2014.
Dijkstra, E.W.: "A Note on Two Problems in Connexion with Graphs", Numerische Mathematik 1, pp. 269-271, 1959.

(Continued)

*Primary Examiner* — Peter Hoang
(74) *Attorney, Agent, or Firm* — Wolf, Greenfield & Sacks, P.C.

(57) ABSTRACT

In a computer system having a display screen configured to display visual content, a plurality of techniques may be identified to be considered for enhancing visual accessibility of a particular collection of visual content to be displayed to an end user on the display screen. For each technique, an algorithm may be applied to compute one or more measures of health of the display of the particular collection of visual content resulting from applying the respective technique to enhance the visual accessibility of the particular collection of visual content. Based at least in part on the computed measures of health, one or more best techniques may be selected and applied to enhance the visual accessibility of the particular collection of visual content. The enhanced particular collection of visual content may be displayed to the end user on the display screen.

16 Claims, 11 Drawing Sheets

(56) References Cited

OTHER PUBLICATIONS

International Search Report and Written Opinion for PCT/US2013/058098, mailed Apr. 2, 2014.

International Preliminary Report on Patentability for PCT/US2013/058098, mailed Mar. 19, 2015.

Examination Report for Application No. GB1505895.1, mailed May 6, 2015.

Gettysburg Address

Four score and seven years ago our fathers brought forth on this continent a new nation, conceived in liberty, and dedicated to the proposition that all men are created equal.

Now we are engaged in a great civil war, testing whether that nation, or any nation so conceived and so dedicated, can long endure. We are met on a great battlefield of that war. We have come to dedicate a portion of that field, as a final resting

FIG. 1F

SELECTING TECHNIQUES FOR ENHANCING VISUAL ACCESSIBILITY BASED ON HEALTH OF DISPLAY

CROSS-REFERENCE TO RELATED APPLICATIONS

This application claims a priority benefit, under 35 U.S.C. §119(e), to U.S. Provisional Application No. 61/697,054, entitled "Enhanced Accessibility Technologies," filed Sep. 5, 2012, which is incorporated herein by reference in its entirety.

BACKGROUND

With regard to computer systems, "accessibility" refers to the extent to which a computer resource (e.g., hardware, software applications, output content, etc.) is usable by people of all abilities and disabilities. In particular, a focus of recent effort has been on making computer content accessible to users with visual impairments. Accessibility Technology (AT) software applications, such as screen magnifiers and screen readers, have been and are continuing to be developed to provide enhancements to visual content on computer displays to make the visual content easier for visually impaired users to consume.

One common type of enhancement is magnification, by which the visual content is enlarged to make it easier to see. Another type of enhancement is color enhancement, by which color of the visual content (e.g., background color, foreground color, reverse contrast, etc.) is adjusted to make the visual content easier to see. Other types of enhancement include pointer/caret/focus enhancements, including various visual indicators of the current position of the mouse pointer, text caret (insertion point), input focus, etc. Yet another type of enhancement is text-to-speech or Braille display, by which visual content is converted to audio or tactile information that a (blind) user can consume.

SUMMARY

One type of embodiment is directed to a method in a computer system having a display screen configured to display visual content, the method comprising: identifying a plurality of techniques to be considered for enhancing visual accessibility of a particular collection of visual content to be displayed to an end user on the display screen; for each technique of the plurality of techniques, applying an algorithm to compute one or more measures of health of the display of the particular collection of visual content resulting from applying the respective technique to enhance the visual accessibility of the particular collection of visual content; based at least in part on the computed measures of health, selecting one or more best techniques from among the plurality of techniques for enhancing the visual accessibility of the particular collection of visual content; applying the selected one or more best techniques to enhance the visual accessibility of the particular collection of visual content; and displaying the enhanced particular collection of visual content to the end user on the display screen.

Another type of embodiment is directed to at least one computer-readable storage medium storing computer-executable instructions that, when executed, perform a method in a computer system having a display screen configured to display visual content, the method comprising: identifying a plurality of techniques to be considered for enhancing visual accessibility of a particular collection of visual content to be displayed to an end user on the display screen; for each technique of the plurality of techniques, applying an algorithm to compute one or more measures of health of the display of the particular collection of visual content resulting from applying the respective technique to enhance the visual accessibility of the particular collection of visual content; based at least in part on the computed measures of health, selecting one or more best techniques from among the plurality of techniques for enhancing the visual accessibility of the particular collection of visual content; applying the selected one or more best techniques to enhance the visual accessibility of the particular collection of visual content; and displaying the enhanced particular collection of visual content to the end user on the display screen.

Another type of embodiment is directed to a computer system comprising a display screen configured to display visual content, at least one processor, and at least one storage medium storing processor-executable instructions that, when executed by the at least one processor, perform a method comprising: identifying a plurality of techniques to be considered for enhancing visual accessibility of a particular collection of visual content to be displayed to an end user on the display screen; for each technique of the plurality of techniques, applying an algorithm to compute one or more measures of health of the display of the particular collection of visual content resulting from applying the respective technique to enhance the visual accessibility of the particular collection of visual content; based at least in part on the computed measures of health, selecting one or more best techniques from among the plurality of techniques for enhancing the visual accessibility of the particular collection of visual content; applying the selected one or more best techniques to enhance the visual accessibility of the particular collection of visual content; and displaying the enhanced particular collection of visual content to the end user on the display screen.

Another type of embodiment is directed to a method in a computer system having a display screen configured to display visual content, the method comprising: identifying a plurality of techniques to be considered for magnifying a particular collection of visual content to be displayed on the display screen; retrieving from a storage medium a first set of one or more rules for magnifying the particular collection of visual content to a first magnification level, the first set of one or more rules specifying a first set of one or more best techniques from among the plurality of techniques for magnifying the particular collection of visual content to the first magnification level; applying the first set of one or more best techniques to magnify the particular collection of visual content to the first magnification level for display on the display screen; retrieving from the storage medium a second set of one or more rules for magnifying the particular collection of visual content to a second magnification level, the second set of one or more rules specifying a second set of one or more best techniques from among the plurality of techniques for magnifying the particular collection of visual content to the second magnification level, the second set of one or more best techniques differing from the first set of one or more best techniques by at least one technique; and applying the second set of one or more best techniques to magnify the particular collection of visual content to the second magnification level for display on the display screen.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 1A-1G illustrate exemplary techniques that may be utilized for enhancing accessibility of visual content in accordance with some embodiments of the present invention;

DETAILED DESCRIPTION

The inventors have recognized that the accessibility of visual content for display in a computer system can be enhanced in numerous ways. The inventors have further appreciated that each potential technique for enhancing visual accessibility may have different advantages and/or disadvantages for different collections of visual content for display, and that one or more enhancement techniques may thus be more or less appropriate than one or more other techniques in particular cases. Some non-limiting examples of potential different techniques for enhancing visual accessibility of visual content are described below. As used herein, the term "content" refers to any data that can be rendered visually in a window (e.g., a window created by a computer operating system) or otherwise on a computer display. Non-limiting examples of content include user interfaces, forms, documents, web pages, etc., and any components of the foregoing (e.g., text, images, buttons, menu options, hyperlinks, etc.).

One possible enhancement technique that may be used in accordance with some embodiments of the invention is referred to herein as "graphical magnification." When graphical magnification is applied to a collection of visual content (e.g., to the visual content in an application window, the visual content in a web page, the visual content on an entire display screen, or any other collection of visual content that together forms the subject of an enhancement operation), the displayed content is enlarged by graphically scaling it along one or more dimensions.

Figure 1A:
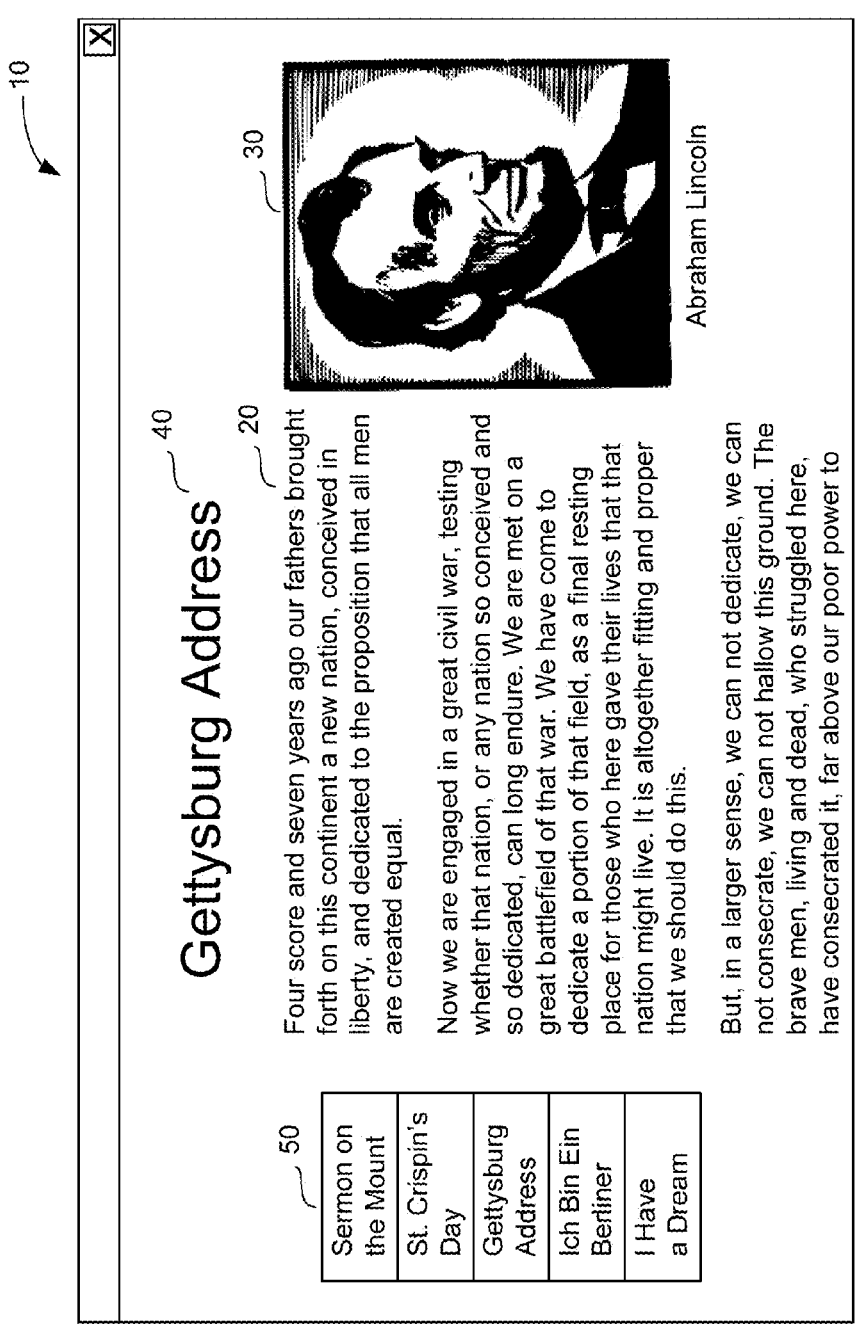
Figure 1B:
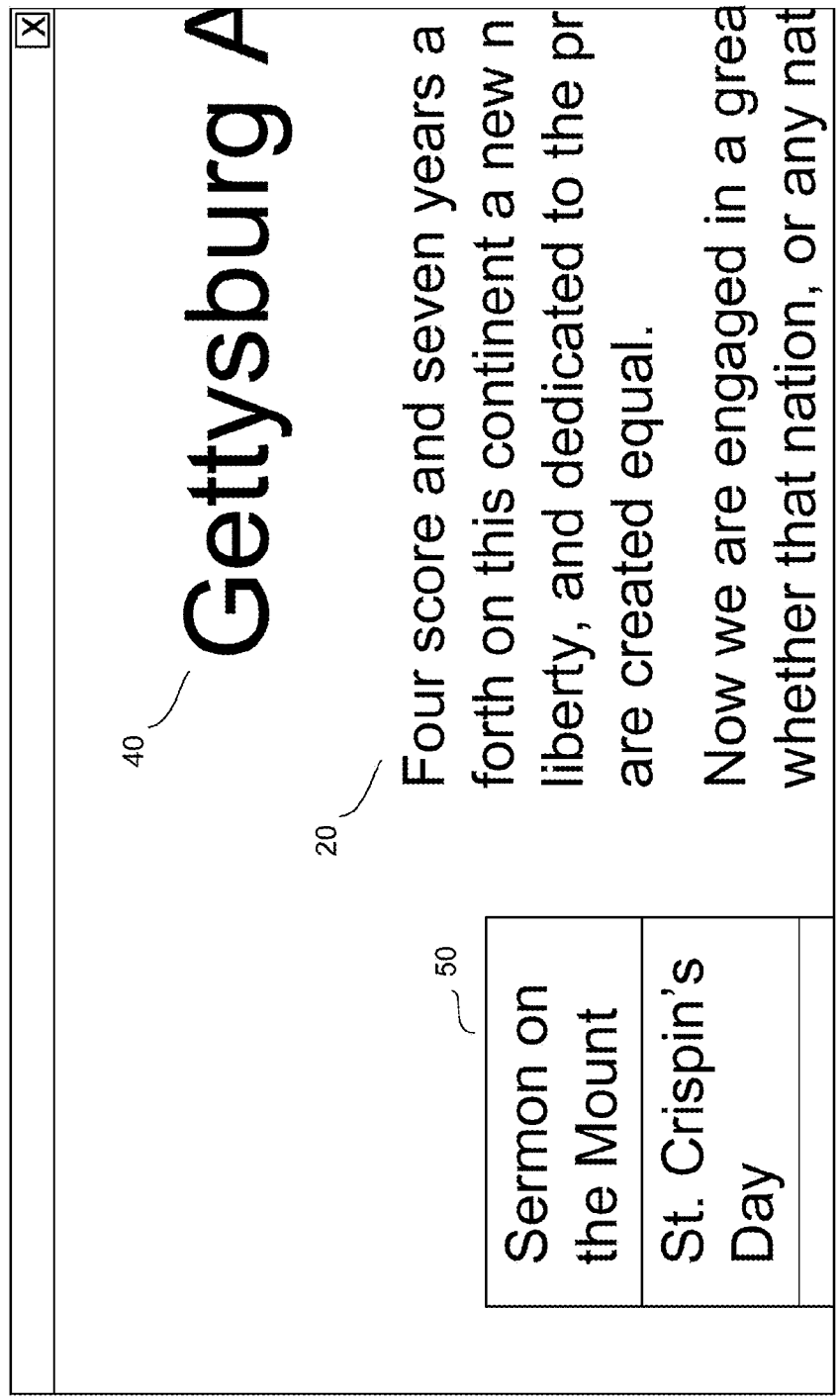

For illustration, FIG. 1A depicts an example of a particular collection of visual content 10, and FIG. 1B shows the result of applying graphical magnification to the particular collection of visual content 10. In this example, the particular collection of visual content 10 is a web page displayed in a web browser window. It should be appreciated, however, that this is merely an example, and aspects of the invention are not limited to application to visual content included in web pages; other examples of suitable collections of visual content are given above. This particular collection of visual content 10 in the example of FIG. 1A includes main text 20, image 30, heading text 40, and sidebar 50. Sidebar 50 includes a list having a number of items (e.g., text list items having underlying hyperlinks), each of which may be selectable to navigate to a different page on the website. In the example of FIG. 1A, the list item "Gettysburg Address" in sidebar 50 corresponds to the web page that is currently on display.

In the example shown in FIG. 1B, graphical magnification has been applied to enlarge the visual content 10 to double ("2×") its size from FIG. 1A. The horizontal and vertical dimensions of all parts of the collection of visual content 10 (including main text 20, image 30, heading text 40, and sidebar 50) have been doubled in size while the size of the browser window has not changed, with the result that only a portion of the magnified content is now visible in FIG. 1B. The browser window can be thought of as a viewing pane (a "viewport") onto a larger virtual area that includes the entirety of the enlarged visual content. Only a portion of the original content is visible at any time, and horizontal and/or vertical scrollbars (not shown) and/or other user input functionality may be provided to enable "movement" of the content behind the viewing pane to bring other portions of the original content into view. In the example of FIG. 1B, the graphical magnification is "window based," because the particular collection of visual content being enhanced is contained in a window, and is enlarged within the window while the window size is kept constant. Graphical magnification may also be performed on collections of visual content not tied to windows. For example, "screen-based" graphical magnification may enlarge the entire collection of visual content on a display screen (e.g., including enlarging the size of any windows displayed on the display screen, along with their contents).

The inventors have appreciated that graphical magnification has the advantage of being able to apply to any visual content that is rendered as pixels. However, the inventors have also recognized that graphical magnification may sometimes lead to disorientation or loss of efficiency for users because of the way some of the original content grows out of the window or off of the screen (and therefore out of view). It may be difficult for a user to keep track of where the virtual viewing pane is within the larger context of the enlarged visual content, especially at high magnification levels when little content is viewable onscreen at any one time. As demonstrated in the example of FIG. 1B, reading text may require continuous horizontal scrolling (e.g., using a scrollbar, and/or panning by automatic tracking of pointer movements, touchpad movements, focus movements, etc.) to follow the lines of text. In main text 20 in FIG. 1B, for example, each line of the enlarged text continues outside the right edge of the window, so that the user must scroll/pan to the right to finish each line, and then scroll/pan back to the left to begin the next line. This may require additional dexterity, cognitive processing and physical work. Vertical movement within a collection of visual content may also be difficult, as for example when the user must first scroll/pan horizontally to find a vertical scrollbar at the horizontal edge of the content. Also, the inventors have recognized that because only a fraction of the original content is viewable with graphical magnification, changes that occur in the content that is currently out of view (e.g., when an alert pop-up appears in a portion of the original screen that is not within the magnified viewport) may be missed by the user. The inventors have recognized that disadvantages of graphical magnification may increase as the magnification level increases.

Graphical magnification may be applied within any suitable bounds of visual content, and is not limited to window-based and screen-based graphical magnification. Another example is container-based graphical magnification, in which graphical magnification is applied to the contents of a container within a window, document, web page, etc. As used herein, the term "container" refers to an onscreen object that contains other objects within it. Non-limiting examples of containers include the entire desktop, viewports, windows, documents, tables, spreadsheets, graphs, lists, menus, boxes, and Document Object Model (DOM) elements that include other DOM elements (e.g, a parent element in a DOM tree includes its child elements).

Figure 1C:
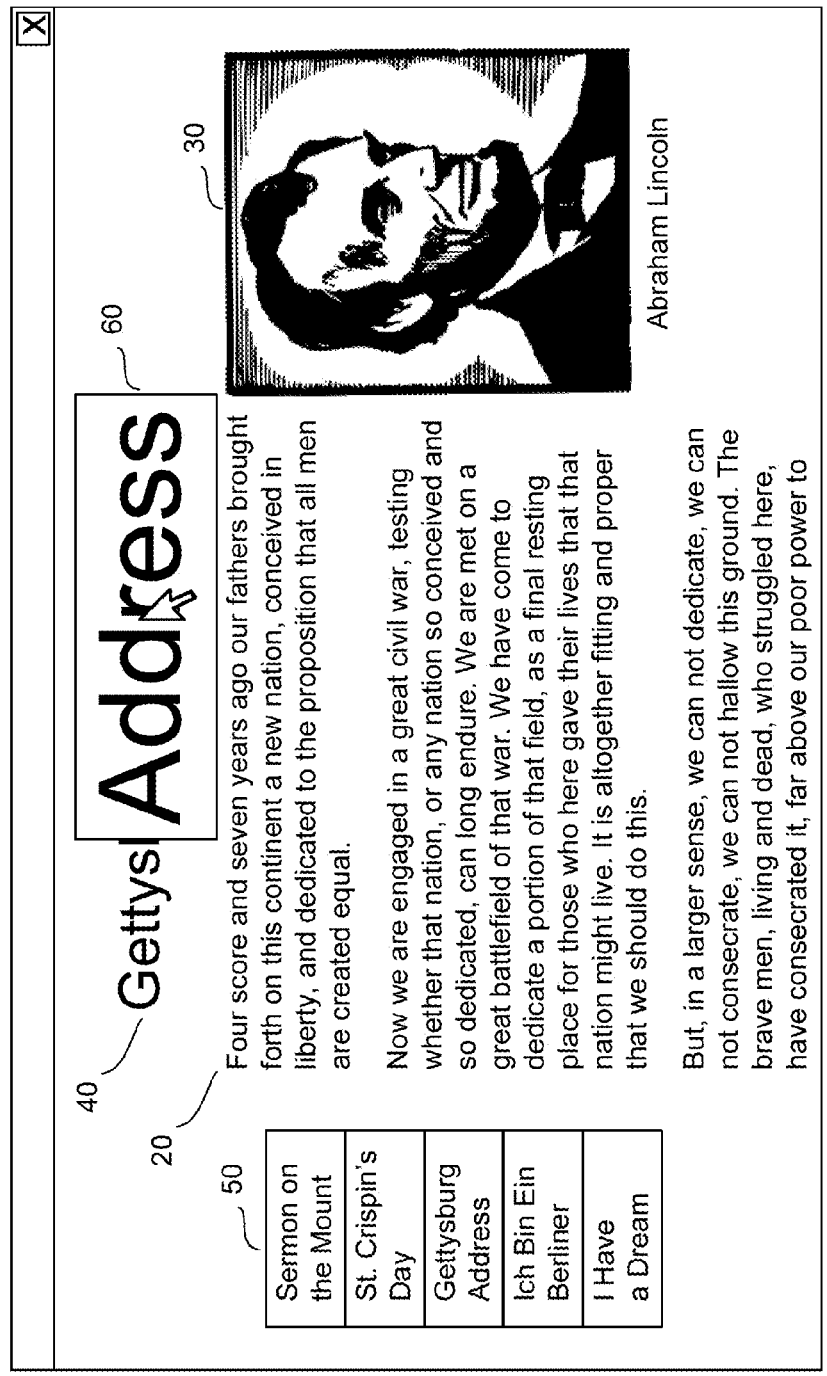

Another specific example of graphical magnification is referred to herein as "lens-based graphical magnification," and is demonstrated in FIG. 1C. In lens-based graphical magnification, a small portion of the collection of visual content on a display screen or within a window is subject to graphical magnification. This creates a movable "lens" whose position may be controlled by user input, e.g., via the pointing device and/or the keyboard. In the example of FIG. 1C, lens 60 follows the location of the pointer, which is currently over the word "Address" in heading text 40.

The inventors have appreciated that lens-based magnification has the advantage of keeping the original content on the screen while magnifying only a small portion around the pointer. However, the inventors have also recognized that lens-based magnification may sometimes cause obscuring of visual content that is adjacent to the portion being magnified. In FIG. 1C, for example, while lens 60 is positioned over the word "Address" in heading text 40, the adjacent word "Gettysburg" is partially covered and difficult to read. Also, the inventors have recognized that it may be difficult for a user to target the pointer over particular content, because it suddenly looks different and shifts position when it enters the lens.

Figure 1D:
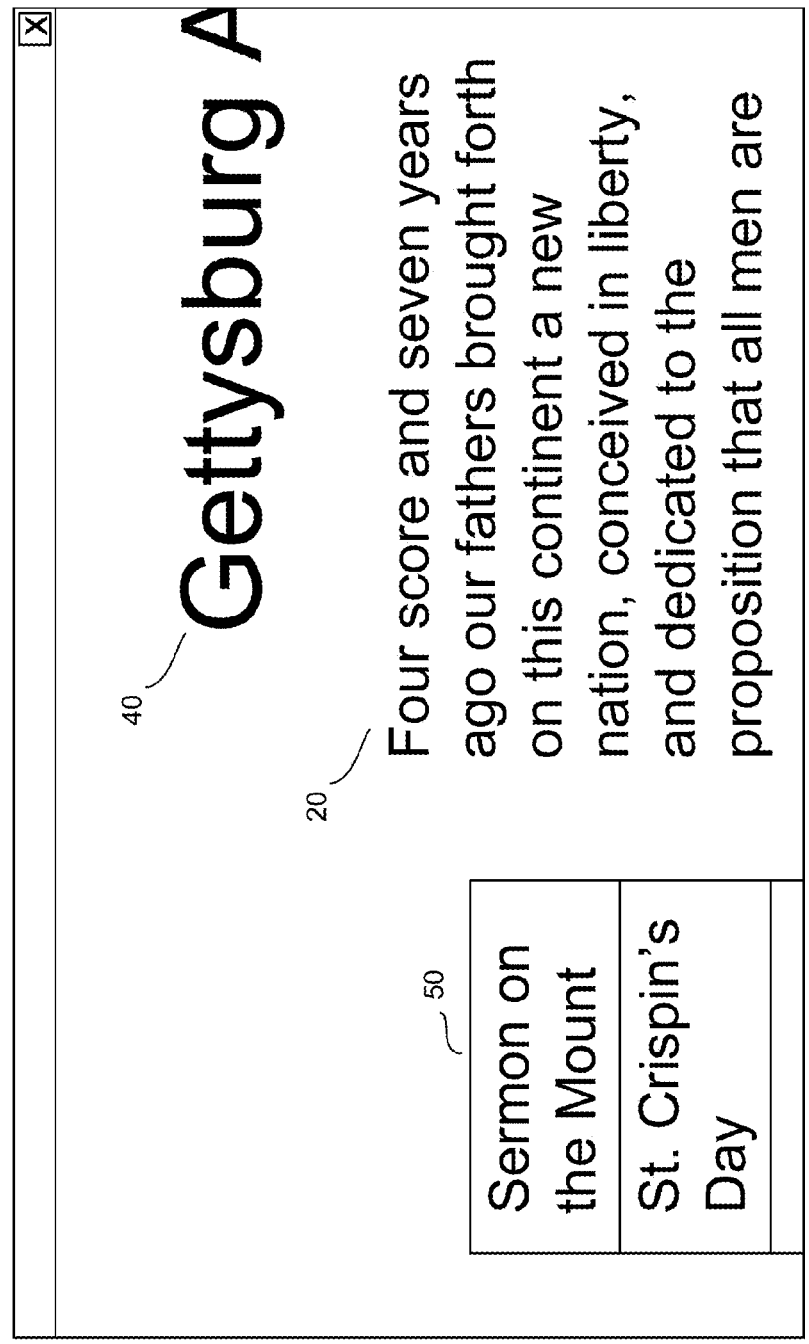

Another possible enhancement technique that may be used in accordance with some embodiments of the invention is referred to herein as "line-wrapped magnification," and is demonstrated in FIG. 1D. In line-wrapped magnification, lines of text are wrapped (i.e., text from one line is moved down to the next line) to accommodate the horizontal width of the window or the display screen. In FIG. 1D, for example, main text 20 has been wrapped so that each line of text no longer runs off the edge of the window as it did in FIG. 1B. The inventors have appreciated that line-wrapped magnification may have the advantage of reducing the need for horizontal scrolling/panning that arises with graphical magnification. However, the inventors have also recognized that line-wrapped magnification may sometimes require additional engineering, and may not be preferable for some types of content, such as tables or content having layouts with specifically positioned objects.

Figure 1E:
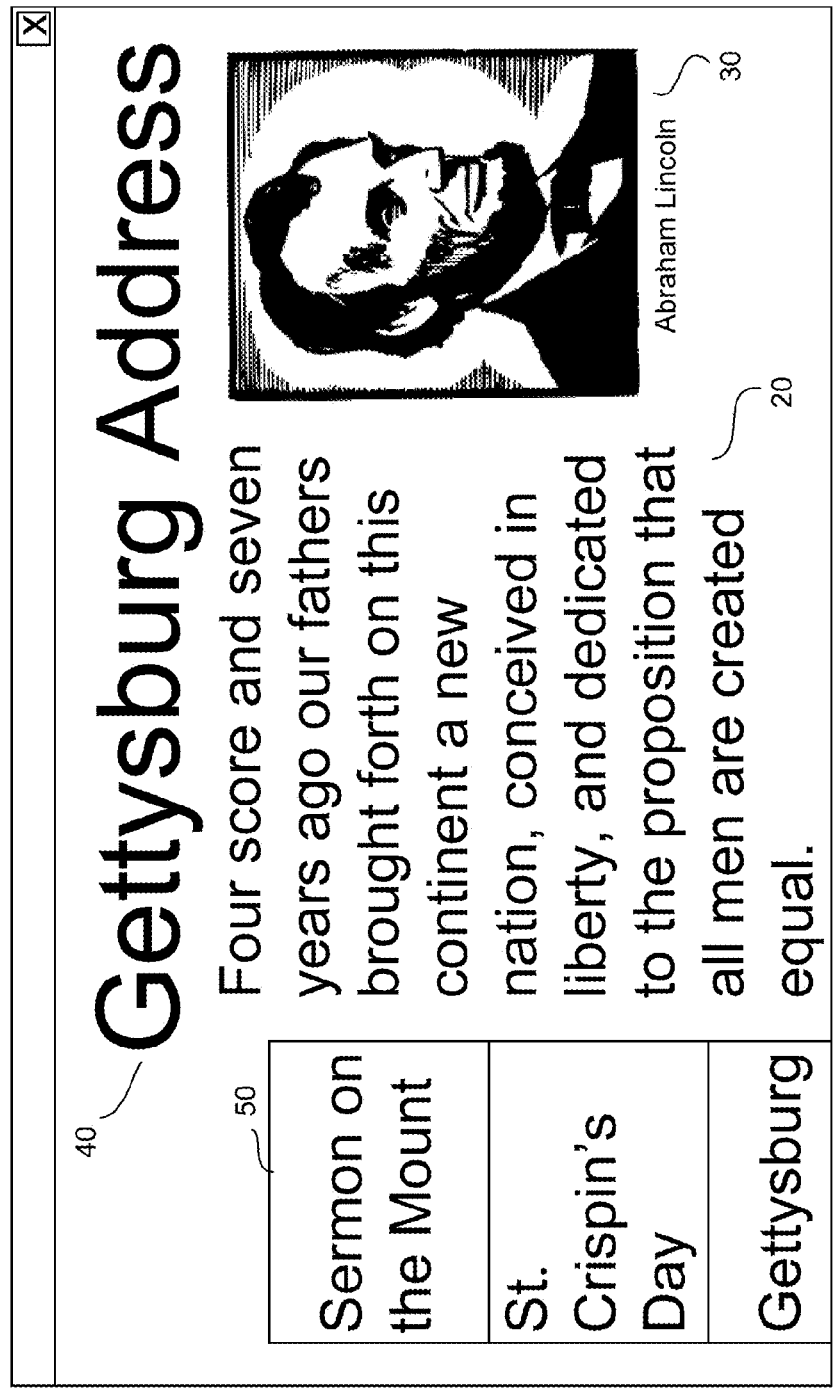

Another possible enhancement technique that may be used in accordance with some embodiments of the invention is referred to herein as "font size adjustment," which may be used to enhance visual content by rendering text using a different font size. In FIG. 1E, for example, the particular collection of visual content 10 has been enhanced by enlarging the font size of all of the text in the display (i.e., main text 20, heading text 40, and the text items in sidebar 50). The inventors have appreciated that font size adjustment may have the advantage of reducing the need for horizontal scrolling/panning to read text, but also may create disadvantages in particular cases. For instance, since (non-text) images are not enlarged, they may remain inaccessible to a visually impaired user. Many images, such as example image 30 in FIG. 1E, contain text (e.g., "Abraham Lincoln") that does not become enlarged using this technique. There may also be a visually unappealing discrepancy between the enlarged text and other unmodified content. The inventors have also recognized that if the containers containing the text are not themselves enlarged in width, they may become too narrow to provide a readable amount of characters or words per line with an increased font size.

Another possible enhancement technique that may be used in accordance with some embodiments of the invention is referred to herein as "layout modification," and is demonstrated in FIG. 1F. Layout modification involves changing the layout of a collection of visual content by shrinking, hiding, or otherwise reducing one or more portions of the visual content to make more room for one or more other portions of the visual content to be enlarged. Thus, in some cases, containers within the collection of visual content may be re-sized to make more or less room for their contents. In the example of FIG. 1F, image 30 and sidebar 50 have been removed from the display to make room for enlarged main text 20 and heading text 40. Layout modification may also include providing controls or other types of selectable options for accessing the content that is reduced or obscured from view. The inventors have appreciated that layout modification may have the advantage of reducing the need for scrolling/panning while viewing content that is most likely of interest to the user. However, the inventors have also recognized that additional complexity may be involved in determining which content is most likely of interest, and/or in providing additional interface components for accessing content that becomes reduced.

Figure 1G:

Yet another possible enhancement technique that may be used in accordance with some embodiments of the invention is referred to herein as "window enlargement," and is demonstrated in FIG. 1G. In this approach, the window containing the collection of visual content is enlarged along with its contents, and may be enlarged to any size up to the maximum allowed by the environment (e.g., by the dimensions of the display screen). The inventors have appreciated that window enlargement may have the advantages of reducing the need for scrolling/panning, and of maintaining the look and feel of the original content layout. However, the inventors have also recognized that users sometimes may not want a window to enlarge and thereby obscure other windows concurrently on the display.

It should be appreciated that the foregoing techniques are described by way of example only, and that aspects of the invention may be applied to any suitable set of techniques for enhancing visual accessibility of visual content, without limitation to any particular techniques or set of techniques.

The inventors have recognized that progress may be made toward maximizing the advantages and minimizing the disadvantages of potential techniques for enhancing visual accessibility by intelligently selecting one or more best techniques for use in enhancing each particular collection of visual content. Accordingly, some embodiments described herein relate to selecting techniques for enhancing visual accessibility based on the resulting health of the particular display, in ways which may address one or more of the above-discussed shortcomings and/or may provide one or more of the foregoing benefits. However, aspects of the invention are not limited to any of these benefits, and it should be appreciated that some embodiments may not provide any of the above-discussed benefits and/or may not address any of the above-discussed deficiencies that the inventors have recognized in particular techniques.

In some embodiments, when multiple potential techniques have been identified for consideration to enhance the visual accessibility of a particular collection of visual content for display in a computer system, an algorithm may be applied to each potential technique to compute one or more measures of health for the display that would result from applying that technique to enhance the visual accessibility of that particular collection of visual content. The measures of health may then be used to select and apply one or more best techniques to enhance that particular collection of visual content. As discussed above, a particular collection of visual content may be a particular web page, the contents of a particular application window being displayed at a particular time, the contents of a particular display screen at a particular time (e.g., a computer desktop, including background, icons, application windows, etc.), and/or any other suitable collection of visual content particularly identifiable as distinct from other collections of visual content.

In some embodiments, the algorithm may be constructed such that different technique(s) will be determined to be best for enhancing visual accessibility of different collections of visual content. In some embodiments, the algorithm may be constructed such that different technique(s) will be determined to be best for achieving different magnification levels for the same collection of visual content. As used herein, the term "magnification level" refers to a multiple of the original pixel size of onscreen content that is magnified. A single pixel from the original display, for example, would appear twice as large and would require 4 pixels to display at a 2× magnification level. For techniques that do not apply the same magnification to all of the content on the display, the magnification level refers to the maximum level of magnification applied to some content in the particular collection. For example, in some embodiments, magnification may be applied preferentially to content that is deemed important (such as the main text of a document) while other less important content (such as menu bars, navigational controls, etc.) may be magnified to a lesser degree or may be left unmagnified or even made smaller. In such cases, the "magnification level" refers to the highest level of magnification applied (i.e., to the important content).

In some embodiments, the algorithm for computing one or more measures of health of the display may be constructed to penalize horizontal overflow (e.g., lines of text becoming longer than the horizontal width of their containers, which may call for text wrapping and/or line-by-line scrolling) and/or other issues such as overlapping content. The inventors have recognized that reducing the need for horizontal scrolling may have benefits such as reducing the amount of work required for a user to find, navigate, browse, and/or read content; reducing physical motion used to manipulate a keyboard and/or pointing device; reducing eye movement and/or strain; reducing cognitive processing; and/or reducing learning for new users of the system. In some embodiments, vertical overflow may not be penalized as heavily as horizontal overflow, as the inventors have appreciated that vertical scrolling in many cases may not be as harmful to the user experience as horizontal scrolling.

In some embodiments, as an alternative or complement to computing one or more measures of display health to determine the best techniques for achieving different magnification levels for particular collections of visual content, one or more rules may alternatively or additionally be provided to specify different techniques that are preferred for different magnification levels. Such rules, for example, may be stored in any suitable storage medium for retrieval and application (e.g., by enhancement software) when a particular collection of visual content is to be magnified.

It should be appreciated that the foregoing description is by way of example only, and aspects of the invention are not limited to providing any or all of the above-described functionality, nor are aspects of the invention limited to providing any or all of the above-described benefits, although some embodiments may provide some or all of the functionality and/or benefits described herein.

The aspects of the present invention described herein can be implemented in any of numerous ways, and are not limited to any particular implementation techniques. Thus, while examples of specific implementation techniques are described below, it should be appreciated that the examples are provided merely for purposes of illustration, and that other implementations are possible.

Figure 2:
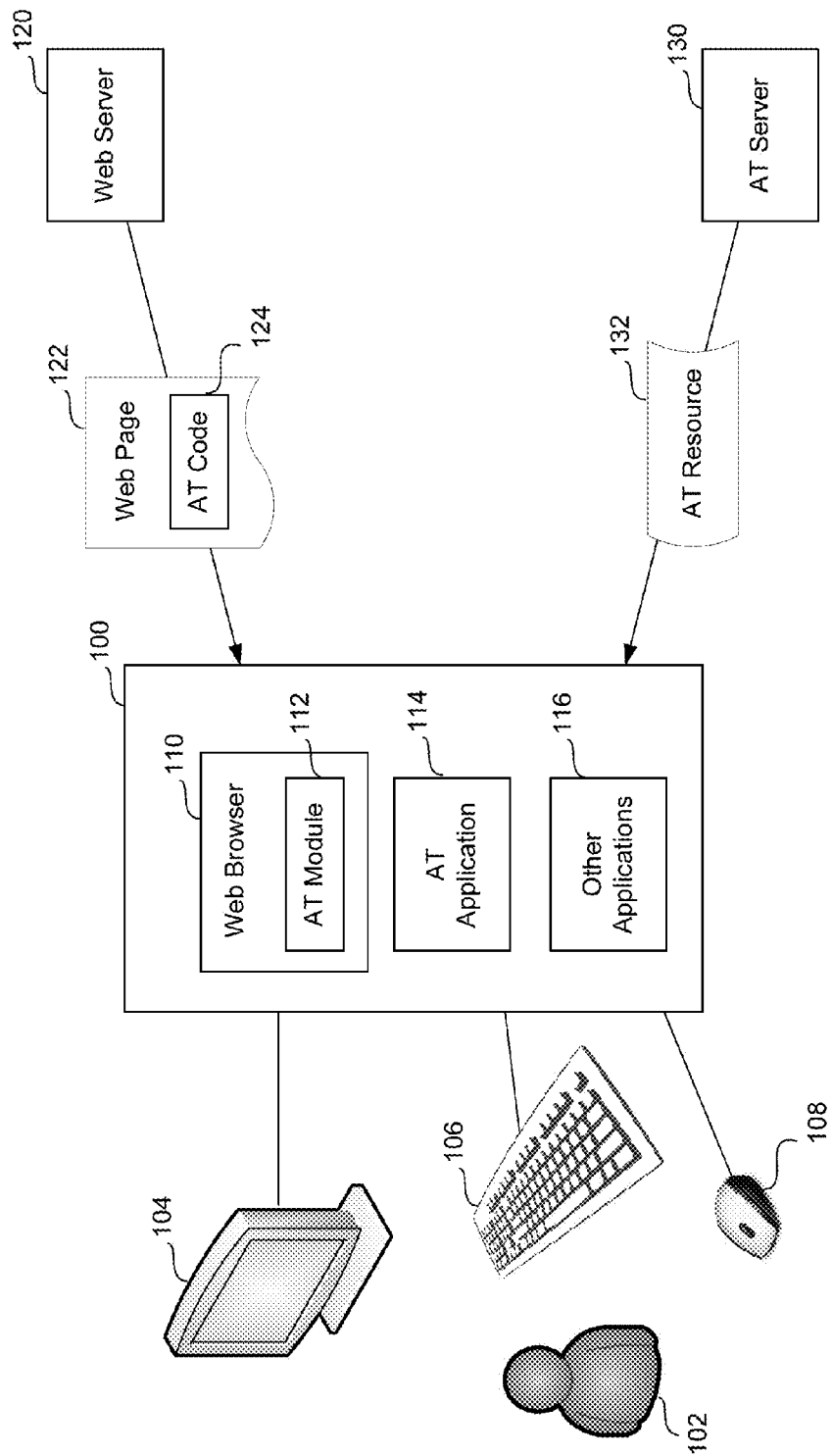
FIG. 2 is a block diagram illustrating an exemplary operating environment for a computer system in accordance with some embodiments of the present invention.

One illustrative application for the techniques described herein is for use in a computer system 100 operated by a (human) user 102. An exemplary operating environment for such a system is illustrated in FIG. 2. Computer system 100 may be implemented in any suitable form, as aspects of the invention are not limited in this respect. For example, computer system 100 may be implemented as a single stand-alone machine, or may be implemented by multiple distributed machines that share processing tasks in any suitable manner. Computer system 100 may be implemented as one or more computers; an example of a suitable computer is described below. In some embodiments, computer system 100 may include one or more tangible, non-transitory processor-readable storage devices storing processor-executable instructions, and one or more processors that execute the processor-executable instructions to perform the functions described herein. The storage devices may be implemented as computer-readable storage media (i.e., tangible, non-transitory computer-readable media) encoded with the processor-executable instructions; examples of suitable computer-readable storage media are discussed below.

Exemplary computer system 100 may receive input from user 102 via one or more input devices such as keyboard 106 and/or pointing device 108, and may provide output to user 102 via one or more output devices such as display screen 104. Any suitable type(s) of display screen, keyboard, pointing device, and/or other input and/or output device(s) may be used, as aspects of the invention are not limited in this respect. Display screen 104 may be any type of display component capable of presenting visual content to user 102, and need not be two-dimensional.

Input and/or output devices such as display screen 104, keyboard 106, and pointing device 108 need not be separate physical devices, but in some embodiments may be integrated in any suitable combination, such as in a touchscreen-type apparatus that combines display screen, keyboard, and/or pointing device functionality. In addition, while a single display screen, keyboard, and pointing device are referred to herein for simplicity, some embodiments may make use of multiple display screens, keyboards, and/or pointing devices to provide equivalent and/or similar functionality.

In the example depicted in FIG. 2, exemplary computer system 100 includes various output-producing components, such as web browser 110, AT application 114, and other applications 116. Each of these processing components of system 100 may be implemented in software, hardware, or a combination of software and hardware. Components implemented in software may comprise sets of processor-executable instructions that may be executed by the one or more processors of computer system 100 to perform the functionality described herein. Each of web browser 110, AT application 114, and other applications 116 may be implemented as a separate component of computer system 100 (e.g., implemented by hardware and/or software code that is independent and performs dedicated functions of the component), or any combination of these components may be integrated into a single component or a set of distributed components (e.g., hardware and/or software code that performs two or more of the functions described herein may be integrated, the performance of shared code may be distributed among two or more hardware modules, etc.). In addition, any one of web browser 110, AT application 114, and other applications 116 may be implemented as a set of multiple software and/or hardware components. Although the example operating environment of FIG. 2 depicts web browser 110, AT application 114, and other applications 116 implemented together on computer system 100, this is only an example; in other examples, any or all of the components may be implemented on one or more separate machines, or parts of any or all of the components may be implemented across multiple machines in a distributed fashion and/or in various combinations. It should be understood that any such component depicted in FIG. 2 is not limited to any particular software and/or hardware implementation and/or configuration.

While web browser 110 and AT application 114 are provided as examples of applications that may be run on computer system 100, it should be appreciated that aspects of the invention are not limited to the inclusion of either or both of web browser 110 and AT application 114. Furthermore, while AT application 114 is provided as a particular example of a component of computer system 100 (e.g., a software application) that may provide functionality described herein (e.g., to enhance visual accessibility of visual content), it should be appreciated that aspects of the invention are not limited to being performed by an AT application, as discussed further below.

In some embodiments, AT application 114 may be configured to operate (e.g., via execution of a set of instructions by the one or more processors of computer system 100) to enhance visual content that is provided for display on display screen 104 by AT application 114 itself and/or by other components such as web browser 110 and/or other applications 116 (including, for example, the operating system of computer system 100). For instance, in one particular example, web browser 110 may provide visual content (e.g., text, images, user interface elements, etc., included in a web page) for display on display screen 104 at a particular default size, and AT application 114 may process the visual content provided by web browser 110 to apply one or more enhancements (e.g., magnification and/or one or more other accessibility enhancements) to the visual content before it is displayed. In such embodiments in which a component (such as AT application 114 or a non-AT component configured to provide functionality described herein) operates to apply enhancements to visual content provided for display by another component (such as, for example, web browser 110, another application 116, an operating system of computer system 100, etc.), the component originally providing the visual content for display is referred to herein as the "originating" component, and the component applying the enhancements to the visual content provided by the originating component is referred to herein as the "enhancement" component.

It should be appreciated that in embodiments in which the functionality described herein is provided by AT application 114 (or a non-AT component configured to provide functionality described herein) running on computer system 100, the functionality may be performed with respect to visual content generated and/or otherwise provided by any suitable component(s) of computer system 100 (including visual content generated by AT application 114 itself), and computer system 100 need not include any particular other components such as web browser 110. In embodiments in which a web browser 110 is included in computer system 100, web browser 110 may be configured (e.g., programmed) to provide access to web pages by downloading a web page 122 from a web server 120, executing the code of web page 122 to render web page 122 visually, and displaying the rendered web page 122 on display screen 104.

In some embodiments, as discussed above, visual content provided by web browser 110, either as part of a rendered web page or as part of the browser tool itself (e.g., browser menu items, buttons on a browser toolbar, etc.), may be enhanced by AT application 114 (or a non-AT component of computer system 100 configured to provide functionality described herein). Alternatively or additionally, in some embodiments web browser 110 may have its own AT module 112 (e.g., a set of instructions) configured to cause web browser 110 to operate (e.g., via execution of the instructions by the one or more processors of computer system 100) to enhance visual content in any of the manners described herein. In such embodiments, for example, web browser 110 (or suitable components of web browser 110 other than AT module 112) may function as originating software for the visual content, and AT module 112 may function as enhancement software with respect to that visual content.

Alternatively or additionally, in some embodiments visual content included in web page 122 may be enhanced by execution of AT code 124 (e.g., one or more instructions) embedded within web page 122 itself. In some embodiments, when web browser 110 executes the code of web page 122, including AT code 124, to render web page 122 for display on display screen 104, the execution of AT code 124 may cause web browser 110 to enhance visual content within the rendered web page in accordance with techniques described herein. In such embodiments, for example, suitable portions of web page 122 (e.g., as interpreted/executed by web browser 110), other than AT code 124, may function as originating software for the visual content, and AT code 124 (e.g., as interpreted/executed by web browser 110) may function as enhancement software with respect to that visual content.

In some embodiments, enhancing visual content provided by any component of computer system 100 may involve downloading an AT resource 132 to computer system 100 from an AT server 130. For example, in some embodiments, AT application 114 and/or web browser 110 (e.g., as directed by instructions contained in AT module 112 and/or AT code 124) may query AT server 130 for enhancements to be applied to certain visual content, to certain web pages, etc., and/or for instructions as to how to apply enhancements (e.g., as to selection of enhancement techniques in accordance with approaches described herein). Thus, for example, AT resource 132 may comprise an indication of one or more enhancement techniques to consider, an indication of one or more mappings of enhancement techniques to visual content to implement, a script (e.g., a set of instructions) to execute, and/or any other suitable resource to enable functionality described herein. In some instances, AT resource 132 may function as enhancement software for visual content provided by other originating software.

It should be appreciated from the foregoing that not all components illustrated in FIG. 2 are necessary to include in the same system to enable the functionality described herein. For example, functionality described herein could be implemented in a computer system having AT application 114 alone and/or in conjunction with AT resource 132; a computer system having web browser 110 in conjunction with AT module 112, AT application 114, and/or AT code 124 embedded in web page 122, with or without the use of AT resource 132; or a computer system having any combination of the above. It should be appreciated that the description with respect to FIG. 2 is merely exemplary, and aspects of the invention are not limited to any particular software configuration or delivery mechanism for the techniques described herein.

In some embodiments, when any suitable component is to enhance the visual accessibility of a particular collection of visual content to be displayed to an end user on the display screen, the component may identify a set of multiple possible techniques to be considered for doing so. For each of the multiple possible techniques, the component may apply an algorithm to compute one or more measures of health of the display that would result from applying that technique to enhance the visual accessibility of that particular collection of visual content, and may select one or more best techniques based at least in part on the computed measures of health. In some embodiments, the selection of the best technique(s) may also be based on other preferences/settings that the host system, content designers, and/or users may have about which techniques are used and in which order they are applied. In some cases, more than one technique may be utilized together to enhance the same collection of visual content.

Any suitable enhancement techniques may be considered, including, for example, any of the techniques discussed above, as aspects of the invention are not limited in this respect. For instance, in one particular example, a set of possible techniques considered for enhancing visual accessibility of a particular collection of visual content in a web page may include the following:

Using the default magnification technique provided by the web browser;
Increasing the size of a container's contents while retaining container width;
Enlarging a container and its contents;
Collapsing, hiding or scrolling less important content out of the current view, to create more room for more important content;
Enlarging the entire web page and its contents; and/or
Enlarging the web browser window and its contents.

When applying an enhancement technique that enhances the visual accessibility of one portion of the collection of visual content (e.g., a more important portion) more than another portion (e.g., a less important portion), a determination of which portion(s) are more important to enhance may be made in any suitable way. In some embodiments, the end user may identify important content, such as by moving the pointer, the user's finger, or a keyboard selection to that area in the collection of content. In some embodiments, the important content may then be identified as not only the text or other object below the selected point, but also an expanded area around the selected point containing an amount of text appropriate for reading. The appropriate area of text to be enhanced may be identified in any suitable way, examples of which are provided below. For example, in some embodiments, an area may be automatically identified using any of various suitable clues, non-limiting examples of which include the number of words, the portion of the display screen the object occupies, and/or the semantic relation to the content that the user selected.

In some embodiments, given the DOM element beneath the pointer as input, a node from among that element and its ancestors in the DOM tree may be selected to highlight. This may be done in any suitable way. In one example, given the current element under consideration, a parent node may be chosen if it contains no more than 5% more words than the original node input, if it occupies no more than 75% of the screen, and/or if certain listed relationships hold (for instance, if it is not the parent of a list <ul>, <ol>, <form>).

Some embodiments may utilize a machine learning model trained on examples from collections of visual content (e.g., web pages) that have been manually (e.g., by one or more humans) marked up to indicate which element of the collection of visual content (e.g., which element in the DOM tree) corresponds to the area of interest when the pointer is placed in a certain location. For each training example, features may be extracted, non-limiting examples of which include (i) percentage difference in number of words in original node (i.e., DOM element beneath the pointer location) and current node under consideration, (ii) percentage difference of height/width between original and current nodes, (iii) parent display value (block/inline), (iv) original display value (block/inline), (v) number of words in original node, (vi) number of words in current node, (vii) tag name of current node (div, p, a, span, etc.), (viii) tag name of original node, etc. Any suitable machine learning technique(s) may be used to train the model, given the marked-up training data, to associate extracted features with likelihoods that particular nodes (e.g., DOM elements) are areas of interest. Non-limiting examples of suitable machine learning techniques include decision tree techniques and support vector machine (SVM) techniques. When the model is applied to identify an unknown area of interest in a new example of content, in some embodiments the same features may be extracted, and the learned likelihoods may be used to select a most probable area of interest.

In some embodiments applying to web pages, if the user does not select which layout is important, the system may attempt to automatically identify important content, e.g., by looking for semantics such as the HTML5 tag <article> or the WAI-ARIA attribute role="main". If those are not present, some embodiments may use a heuristic to identify important content, for example selecting the widest column (e.g., as defined in the DOM) which is not a header (top of the page) or footer (bottom of the page).

It should be appreciated that the foregoing description is merely by way of example, and that aspects of the invention are not limited to any particular approaches for distinguishing content that is more important to enhance from content that is less important to enhance, and some embodiments may not make such identifications.

In some embodiments, the predicted impact of enhancement of a particular collection of visual content using a certain enhancement technique or combination of enhancement techniques, and/or the predicted interaction of such an enhancement technique with other preferences/settings may be computed as one or more measures of health of the resulting display, which may be used to determine which enhancement technique(s) to apply next. Any suitable algorithm may be constructed for computing the measure(s) of health, and any such algorithm may have any suitable input(s) and/or output(s), as aspects of the invention are not limited in this respect. Non-limiting examples of suitable inputs for a display health algorithm may include:

The current magnification level;
The next magnification level desired;
One or more portions of the collection of visual content (e.g., one or more DOM nodes) that are particularly important to enhance;
The rendered collection of visual content;
The current application settings (e.g., default font size, available transforms (versions of CSS supported, Flash supported), etc.) and context (e.g., application magnification level, window size, etc.);
The current host system settings (e.g., available inputs, available colors, default font sizes, available display screen size, etc.);
The current user preferences/settings; and/or
Preferences/settings specified by the content designer.

A non-limiting example of suitable output (i.e., one or more measures of health) for a display health algorithm may include a number or tuple providing a measure of impact of enhancement techniques on the health of a display of a particular collection of visual content. In some embodiments, the measure may be a single number, while in other embodiments, the measure may be a tuple of numbers representing different aspects of display health, such as the number of elements expected to spill out of their parent containers, the amount of horizontal scrolling expected to be caused by the enhancement, etc.

Display health algorithms may be constructed by any suitable party or parties, such as the user, the content designer, a third-party intermediary, and/or a designer of the enhancement software or system (e.g., as a default). In some embodiments, the algorithm can take into account such metrics as when layout breaks (and how badly it breaks), estimates of the impact on the usability layout of the page, the introduction of horizontal scrolling, the cost of different transformations, heuristic rules or ordering preferences (for instance, a preference may be to start with font size increases and then move to graphical magnification, or a different ordering), appropriateness of the resulting text size, appropriateness of resulting formatting/layout changes, pixel-by-pixel differences, whether the enhancement results in text and/or other content overlap, and/or user, system, and/or designer preferences.

As discussed above, any suitable algorithm may be defined, as aspects of the invention are not limited to any particular display health algorithm. In one particular non-limiting example of an algorithm for computing a measure of health of the display of a web page, the width of the browser window may be subtracted from the width of the web page document to obtain the horizontal scroll distance. This horizontal scroll distance may then be multiplied by the area of the web page, and the result may then be summed with the combined area of all DOM elements that have exceeded the bounds of their parent DOM elements. In this particular example, a large resulting measure would indicate a significant decrease (i.e., a negative effect) on the health of the display.

In some embodiments, one or more measures of health may be computed by directly applying a particular enhancement technique or combination of enhancement techniques, and then applying the algorithm to compute one or more measures of health directly on the enhanced collection of visual content. In some embodiments, this may be done for all techniques being considered, and the technique resulting in the best measure(s) of health may be selected and used for the final enhancement.

In some embodiments, enhancement techniques may be applied temporarily to visual content being displayed (e.g., in a browser, for web pages), and one or more measures of health may be calculated based on the changed rendering. Alternatively or additionally, in some embodiments the above approach may be applied to a copy of the particular collection of visual content that may be hidden, such that the temporary "trial-and-error" enhancement may not be visible on the actual display screen. In other embodiments, one or more estimation techniques may be used to compute measure(s) of health without actually applying the enhancement technique to the visual content to produce the inputs to the display health algorithm. Any suitable estimation technique(s) may be used, as aspects of the invention are not limited in this respect. For example, in some embodiments, functionality provided in one or more web browser toolkits may be utilized to estimate values (e.g., resulting horizontal scroll distance, etc.) for inputs to the display health algorithm. In still other embodiments, a mixed approach may combine estimates with feedback from the user (e.g., user confirmation that the observed changes had positive or negative effects on display health) after application of the enhancement technique.

Some exemplary embodiments may create a graph for a particular collection of visual content, in which magnification levels are represented as nodes and the edges between them represent various possible enhancement techniques with their associated measures of resulting display health. Such a graph may be statically or dynamically created at any time, as well as updated at any time, and may include any number of magnification levels, any number of steps of higher or lower magnification level, any increment of those magnification levels, etc. For instance, a subgraph including only the current magnification level extending to a single increase increment may be used to determine how to enlarge forward.

In some exemplary embodiments, the selection of the best technique(s) to apply may be made by solving a shortest path problem on such a graph. The current magnification level may be a node in the graph, and edges may extend from it for each possible enhancement technique being considered, with weights representing their corresponding measures of display health. The edges may connect to nodes that represent the resulting magnification levels after applying the respective enhancement techniques. Thus, to select the best technique for achieving magnification level z+i from current magnification level z may amount to performing a shortest path search on the graph between current node z and a node with magnification level z+i. Any suitable technique(s) for finding such a shortest path may be used, as aspects of the invention are not limited in this respect. In one example, a shortest path may be determined using Dijkstra's algorithm, e.g., as described in E. W. Dijkstra (1959), "A Note on Two Problems in Connexion with Graphs," *Numerische Mathematik* 1, pp. 269-271. This publication is incorporated herein by reference in its entirety.

In some embodiments, measures of display health may be pre-computed and/or estimated before an enhancement operation takes place, such that the pre-computed measures need only be compared at run time to determine which enhancement technique(s) will be best to achieve a particular target magnification level. However, in other embodiments, measures of display health may be computed on demand, such as by applying enhancement techniques in a trial-and-error fashion before settling on one or more best techniques to achieve a particular target magnification level for a particular collection of visual content.

In some embodiments, any desired preference may be encoded in the display health algorithm to influence the selection of the best enhancement technique(s). For instance, a preference to use one technique (e.g., font size increase) until magnification level 2× and then switch to another technique (e.g., graphical magnification) could be implemented by constructing the display health algorithm to assign more negative display health effect to graphical magnification than to font size increase for magnification levels less than 2×, and vice versa for magnification levels greater than or equal to 2×.

In some embodiments, heuristics may be used to limit the search space. For instance, for small amounts of magnification, increasing the font size may be preferred. For higher magnification levels, graphical magnification may be desirable. The order of these rules could be specified by any suitable party or parties, such as the system developer, the end user, and/or third parties, based on their preferences. Some embodiments may carry calculations forward, for instance assuming that a particular technique's effectiveness from magnification level z to z+i may be similar from z+i to z+i+j.

Thus, it should be appreciated that in some embodiments, the best techniques for achieving different magnification levels may be pre-specified rather than determined at run time by computing measures of display health. For example, in some embodiments, a set of rules may be stored in a storage medium for access when performing magnification, and may specify different magnification techniques that are preferable for achieving different magnification levels. In some embodiments, rules may be generated and stored for particular collections of visual content, and/or for particular types of visual content, such that retrieving the appropriate rules for magnifying a particular collection of visual content may involve querying the stored rules based on the particular collection of visual content being magnified and the target magnification level. In some embodiments, the rules may have been generated based on past computations of display health for the same collection of visual content or for similar collections of visual content.

In some embodiments, techniques described herein may be applied to select from among multiple possible enhancement techniques when an end user inputs an instruction to enhance a particular collection of visual content. For example, in some embodiments, the end user may specify a desired magnification level or change in magnification level, and the system may automatically determine which enhancement technique(s) to apply to achieve the desired magnification level using approaches described herein. In some embodiments, a single-input control, such as a slider, may be provided to the user to input the instruction to enhance the particular collection of visual content, with the result that the system will opportunistically select from among the available enhancement techniques to do so.

Figure 3:
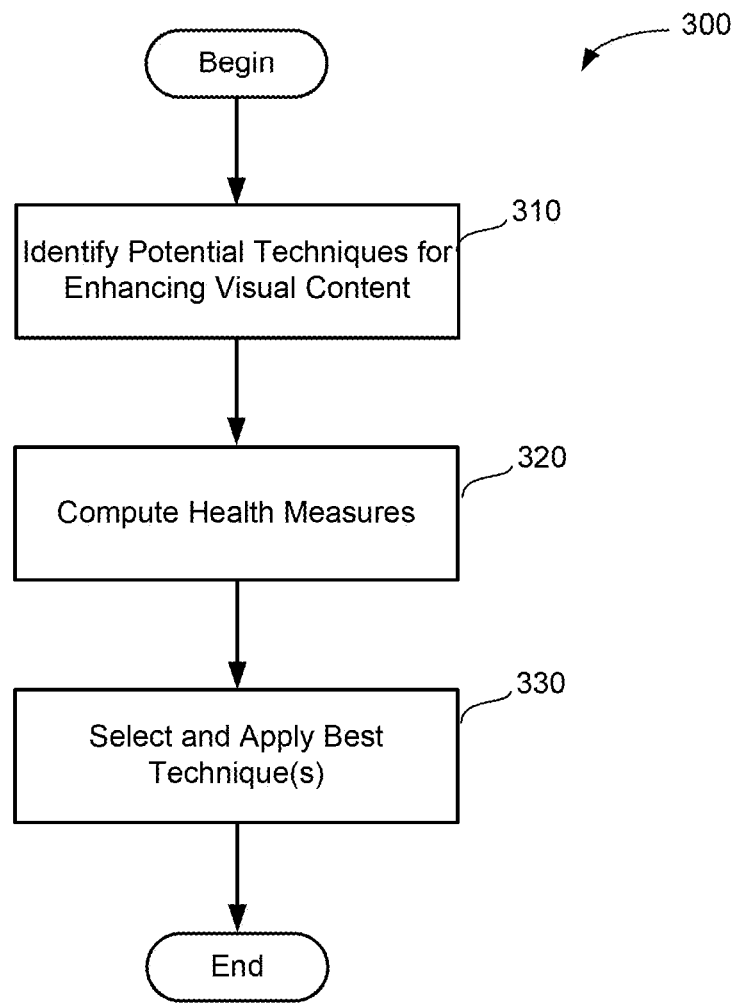
FIG. 3 is a flowchart illustrating an exemplary method in accordance with some embodiments of the present invention.

It should be appreciated from the foregoing that one embodiment of the invention is directed to a method 300 for selecting enhancement techniques based on display health, as illustrated in FIG. 3. Method 300 may be performed, for example, by one or more components of a computer system 100, although other implementations are possible, as method 300 is not limited in this respect. Method 300 begins at act 310, at which a plurality of techniques may be identified to be considered for enhancing visual accessibility of a particular collection of visual content to be displayed to an end user on a display screen. At act 320, for each technique, an algorithm may be applied to compute one or more measures of health of the display of the particular collection of visual content resulting from applying that enhancement technique. At act 330, one or more best techniques may be selected based at least in part on the computed measures of health, and the selected technique(s) may be applied to enhance the visual accessibility of the particular collection of visual content.

Figure 4:
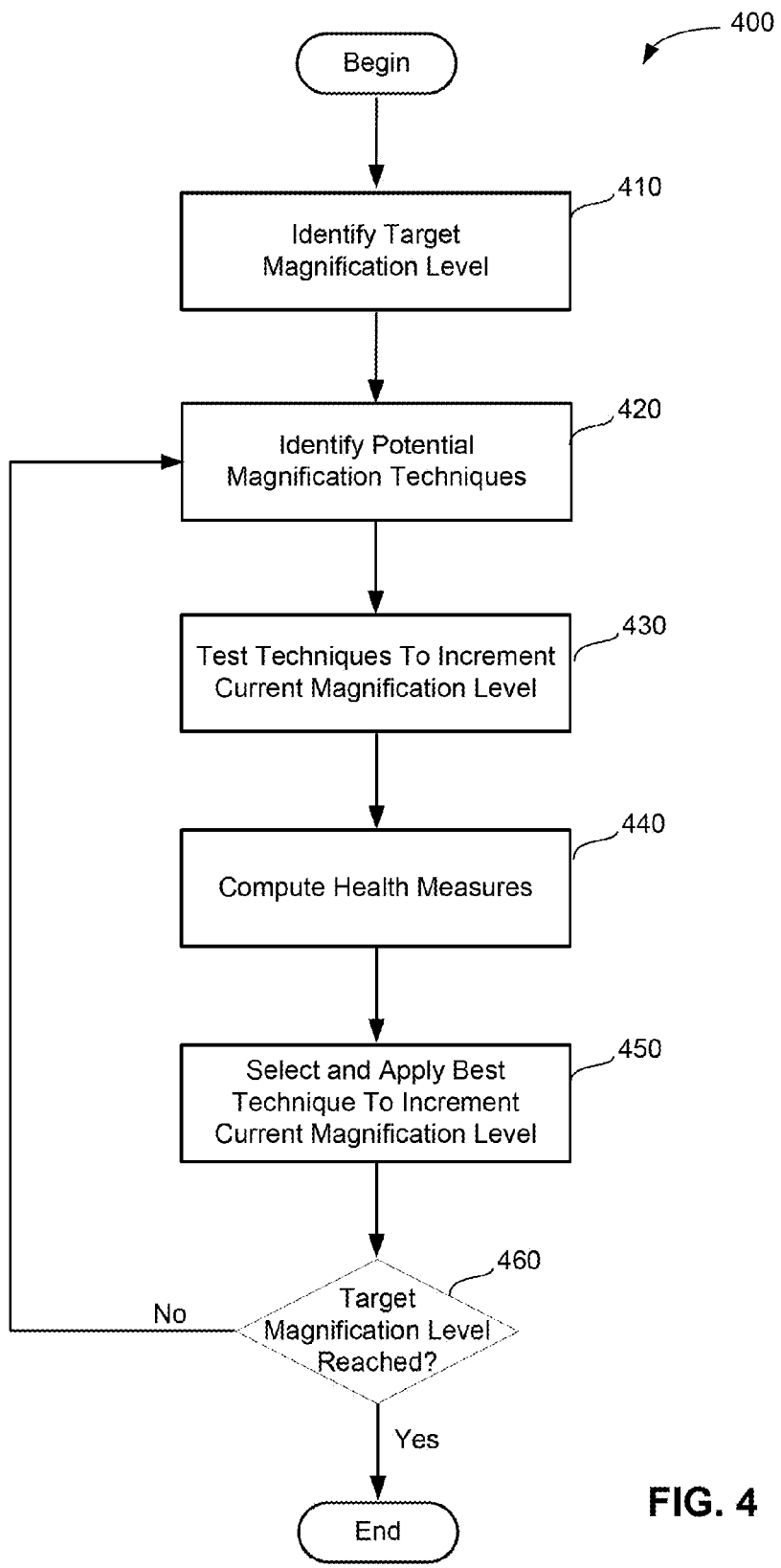
FIG. 4 is a flowchart illustrating another exemplary method in accordance with some embodiments of the present invention.

It should be further appreciated from the foregoing that another embodiment of the invention is directed to a method 400 for magnifying visual content, as illustrated in FIG. 4. Method 400 may be performed, for example, by one or more components of a computer system 100, although other implementations are possible, as method 400 is not limited in this respect. Method 400 begins at act 410, at which a target magnification level for a particular collection of visual content may be identified. For example, user input may be received that indicates a desired magnification level setting (e.g., the user may input a command to change from the current magnification level of, say, 1× to a target magnification level of 4×, or any other suitable magnification level).

At act 420, a number of techniques may be identified to be considered for magnifying the particular collection of visual content. At act 430, each technique may be applied on a trial basis to increment the current magnification level by a suitably defined increment smaller than the total distance to the target magnification level. For example, instead of testing each available technique by applying it to change the magnification level from 1× directly to 4×, the techniques may first be tested on a smaller increment such as magnification from 1× to 2×, from 1× to 1.5×, from 1× to 1.1×, or any other suitable increment. In some embodiments, this may have the benefit of somewhat masking the trial-and-error testing of the various magnification techniques from the user, and/or of allowing multiple magnification techniques to be combined by iteratively selecting the best technique for each increment traveled in the magnification level change.

At act 440, an algorithm may be applied to compute one or more measures of health of the resulting display of the particular collection of visual content after applying each magnification technique to achieve the current increment in the magnification level. At act 450, a best technique may be selected for the current magnification level increment based at least in part on the computed measures of health, and the selected technique may be finally applied to complete the current increment in the magnification level. At act 460, having incremented the magnification level using the selected best technique, the new magnification level may be compared with the target magnification level to determine whether the target magnification level has been reached. If the target magnification level has been reached, method 400 may end. If the target magnification level has not been reached, method 400 may loop back to act 420 to continue to iterate by incrementing the magnification level using the best magnification technique determined for each increment.

Figure 5:
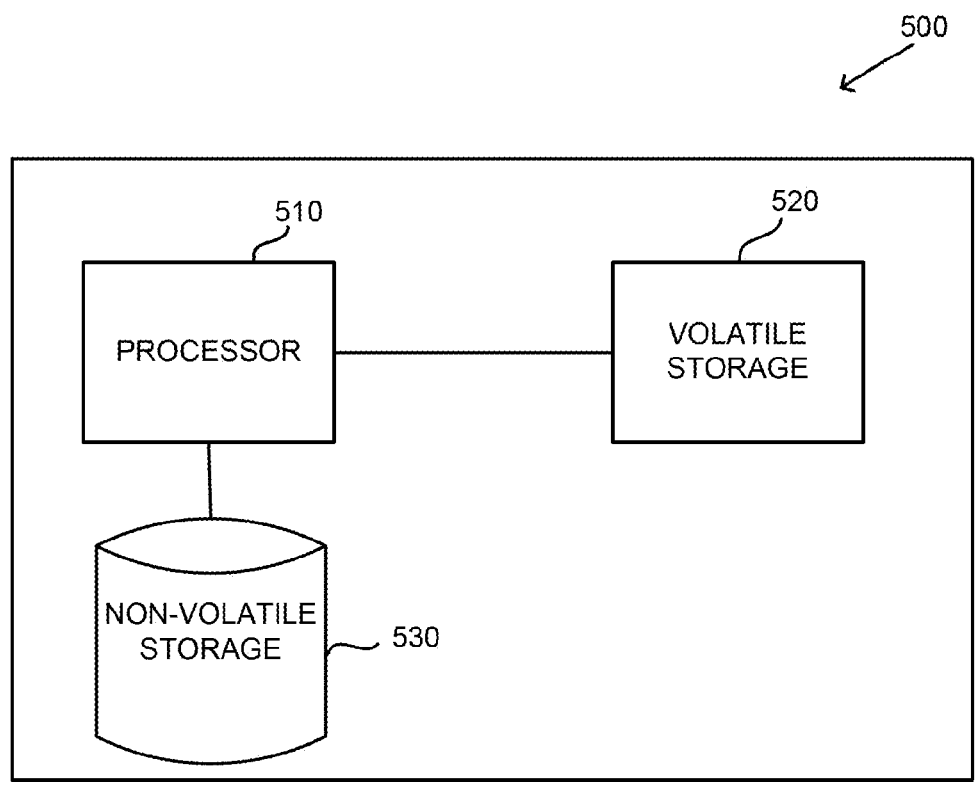
FIG. 5 is a block diagram illustrating an exemplary computer system on which aspects of the present invention may be implemented.

A computer system in accordance with the techniques described herein may take any suitable form, as aspects of the present invention are not limited in this respect. An illustrative implementation of a computer system 500 that may be used in connection with some embodiments of the present invention is shown in FIG. 5. One or more computer systems such as computer system 500 may be used to implement any of the functionality described above. The computer system 500 may include one or more processors 510 and one or more computer-readable storage media (i.e., tangible, non-transitory computer-readable media), e.g., volatile storage 520 and one or more non-volatile storage media 530, which may be formed of any suitable non-volatile data storage media. The processor 510 may control writing data to and reading data from the volatile storage 520 and/or the non-volatile storage device 530 in any suitable manner, as aspects of the present invention are not limited in this respect. To perform any of the functionality described herein, processor 510 may execute one or more instructions stored in one or more computer-readable storage media (e.g., volatile storage 520 and/or non-volatile storage 530), which may serve as tangible, non-transitory computer-readable media storing instructions for execution by the processor 510.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

It should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

In this respect, it should be appreciated that one implementation of embodiments of the present invention comprises at least one computer-readable storage medium (i.e., at least one tangible, non-transitory computer-readable medium, e.g., a computer memory (e.g., hard drive, flash memory, processor working memory, etc.), a floppy disk, an optical disc, a magnetic tape, or other tangible, non-transitory computer-readable medium) encoded with a computer program (i.e., a plurality of instructions), which, when executed on one or more processors, performs above-discussed functions of embodiments of the present invention. The computer-readable storage medium can be transportable such that the program stored thereon can be loaded onto any computer resource to implement aspects of the present invention discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed aspects of the present invention.

The phraseology and terminology used herein is for the purpose of description and should not be regarded as limiting. The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. In a computer system having a display screen configured to display visual content, a method comprising:

retrieving from a storage medium a set of one or more rules for magnifying a particular collection of visual content, including at least a span of text, to be displayed on the display screen, the set of one or more rules specifying different magnification techniques for achieving different magnification levels, including a first set of one or more techniques for magnifying the particular collection of visual content to magnification levels below a threshold specified by the set of one or more rules and a second set of one or more techniques for magnifying the particular collection of visual content to magnification levels above the threshold specified by the set of one or more rules, the second set of one or more techniques differing from the first set of one or more techniques by at least one technique;

applying the first set of one or more techniques to magnify the particular collection of visual content to a first magnification level below the threshold, for display on the display screen, wherein applying the first set of one or more techniques to magnify the particular collection of visual content comprises applying a magnification technique with text wrapping to the span of text in the particular collection of visual content; and applying the second set of one or more techniques to magnify the particular collection of visual content to a second magnification level above the threshold, for display on the display screen, wherein applying the second set of one or more techniques to magnify the particular collection of visual content comprises applying to the span of text in the particular collection of visual content a magnification technique that does not wrap text;

wherein applying the magnification technique that does not wrap text comprises introducing horizontal scrolling to the particular collection of visual content at the second magnification level, and wherein applying the magnification technique with text wrapping does not comprise introducing horizontal scrolling to the particular collection of visual content at the first magnification level.

2. At least one non-transitory computer-readable storage medium storing computer-executable instructions that, when executed, perform a method in a computer system having a display screen configured to display visual content, the method comprising:

retrieving from a storage medium a set of one or more rules for magnifying a particular collection of visual content, including at least a span of text, to be displayed on the display screen, the set of one or more rules specifying different magnification techniques for achieving different magnification levels, including a first set of one or more techniques for magnifying the particular collection of visual content to magnification levels below a threshold specified by the set of one or more rules and a second set of one or more techniques for magnifying the particular collection of visual content to magnification levels above the threshold specified by the set of one or more rules, the second set of one or more techniques differing from the first set of one or more techniques by at least one technique;

applying the first set of one or more techniques to magnify the particular collection of visual content to a first magnification level below the threshold, for display on the display screen, wherein applying the first set of one or more techniques to magnify the particular collection of visual content comprises applying a magnification technique with text wrapping to the span of text in the particular collection of visual content; and applying the second set of one or more techniques to magnify the particular collection of visual content to a second magnification level above the threshold, for display on the display screen, wherein applying the second set of one or more techniques to magnify the particular collection of visual content comprises applying to the span of text in the particular collection of visual content a magnification technique that does not wrap text;

wherein applying the magnification technique that does not wrap text comprises introducing horizontal scrolling to the particular collection of visual content at the second magnification level, and wherein applying the magnification technique with text wrapping does not comprise introducing horizontal scrolling to the particular collection of visual content at the first magnification level.

3. In a computer system having a display screen configured to display visual content, a method comprising:
receiving an instruction to magnify a collection of visual content comprising at least a span of text to a specified magnification level for display on the display screen;
comparing the specified magnification level to a threshold specified by a set of one or more rules specifying different magnification techniques for achieving different magnification levels; and
magnifying the collection of visual content to the specified magnification level for display on the display screen, the magnifying comprising:
if the specified magnification level is not higher than the threshold, applying a magnification technique with text wrapping to the span of text; and
if the specified magnification level is higher than the threshold, applying to the span of text a magnification technique that does not wrap text;
wherein applying the magnification technique that does not wrap text comprises introducing horizontal scrolling, and applying the magnification technique with text wrapping does not comprise introducing horizontal scrolling.

4. The method of claim 3, wherein applying the magnification technique with text wrapping comprises increasing a font size of the span of text.

5. The method of claim 3, wherein applying the magnification technique with text wrapping comprises increasing a size of the span of text while retaining a width of a container of the span of text.

6. The method of claim 3, wherein applying the magnification technique that does not wrap text comprises applying a graphical magnification technique to the span of text.

7. The method of claim 3, further comprising computing the threshold at least in part by applying an algorithm to compute one or more measures of health of the display of the collection of visual content resulting from applying the magnification techniques with and without text wrapping to magnify the collection of visual content to different magnification levels.

8. The method of claim 3, further comprising using a different threshold for a different collection of visual content.

9. The method of claim 3, wherein the threshold is customized to a particular web page.

10. At least one non-transitory computer-readable storage medium storing computer-executable instructions that, when executed, perform a method in a computer system having a display screen configured to display visual content, the method comprising:
receiving an instruction to magnify a collection of visual content comprising at least a span of text to a specified magnification level for display on the display screen;
comparing the specified magnification level to a threshold specified by a set of one or more rules specifying different magnification techniques for achieving different magnification levels; and
magnifying the collection of visual content to the specified magnification level for display on the display screen, the magnifying comprising:
if the specified magnification level is not higher than the threshold, applying a magnification technique with text wrapping to the span of text; and
if the specified magnification level is higher than the threshold, applying to the span of text a magnification technique that does not wrap text;
wherein applying the magnification technique that does not wrap text comprises introducing horizontal scrolling, and applying the magnification technique with text wrapping does not comprise introducing horizontal scrolling.

11. The at least one non-transitory computer-readable storage medium of claim 10, wherein applying the magnification technique with text wrapping comprises increasing a font size of the span of text.

12. The at least one non-transitory computer-readable storage medium of claim 10, wherein applying the magnification technique with text wrapping comprises increasing a size of the span of text while retaining a width of a container of the span of text.

13. The at least one non-transitory computer-readable storage medium of claim 10, wherein applying the magnification technique that does not wrap text comprises applying a graphical magnification technique to the span of text.

14. The at least one non-transitory computer-readable storage medium of claim 10, wherein the method further comprises computing the threshold at least in part by applying an algorithm to compute one or more measures of health of the display of the collection of visual content resulting from applying the magnification techniques with and without text wrapping to magnify the collection of visual content to different magnification levels.

15. The at least one non-transitory computer-readable storage medium of claim 10, wherein the method further comprises using a different threshold for a different collection of visual content.

16. The at least one non-transitory computer-readable storage medium of claim 10, wherein the threshold is customized to a particular web page.

* * * * *